Jan. 14, 1930.　　W. H. FURNESS ET AL　　　1,743,128
AUTOMOBILE BRAKING MECHANISM
Filed Aug. 19, 1925　　3 Sheets-Sheet 1

INVENTOR
William H. Furness and
BY Standish Forde Hansell

Synnestvedt & Lechner
ATTORNEYS

Jan. 14, 1930. W. H. FURNESS ET AL 1,743,128
AUTOMOBILE BRAKING MECHANISM
Filed Aug. 19, 1925    3 Sheets-Sheet 2
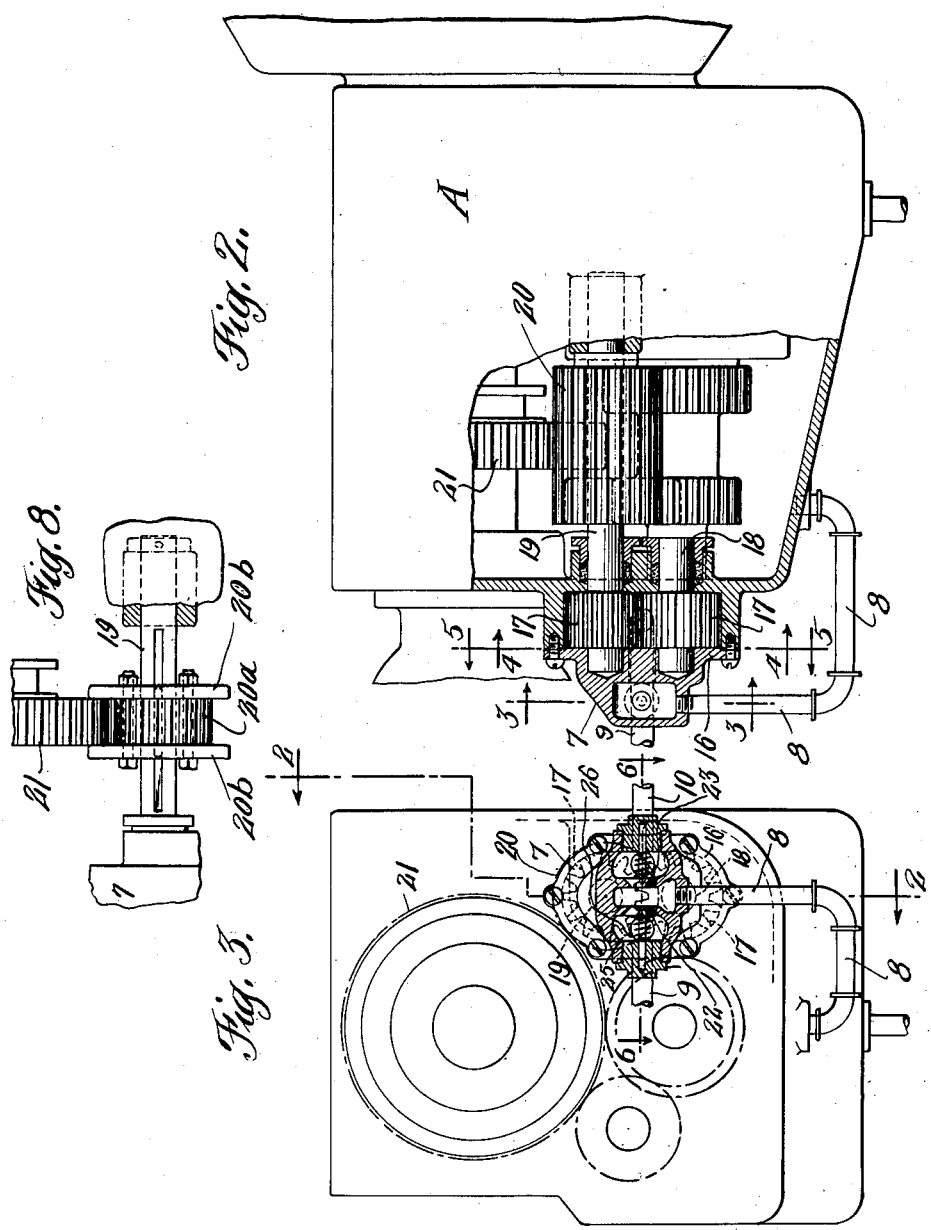
INVENTOR
William H. Furness &
BY Standish Forde Hansell
Synnestvedt & Lechner
ATTORNEYS Jan. 14, 1930. W. H. FURNESS ET AL 1,743,128
AUTOMOBILE BRAKING MECHANISM
Filed Aug. 19, 1925     3 Sheets-Sheet 3

INVENTOR
William H. Furness and
BY Standish Forde Hansell

Synnestvedt + Lechner
ATTORNEYS

Patented Jan. 14, 1930

1,743,128

UNITED STATES PATENT OFFICE

WILLIAM H. FURNESS, OF NATIONAL PARK, NEW JERSEY, AND STANDISH F. HANSELL, OF EDDINGTON, PENNSYLVANIA, ASSIGNORS TO FRANK R. HANSELL AND WILLIAM H. FURNESS, TRADING AS AUTOMATIC BRAKE CONTROL COMPANY OF PHILADELPHIA

AUTOMOBILE BRAKING MECHANISM

Application filed August 19, 1925. Serial No. 51,084.

This invention relates to braking mechanism and is particularly useful on automobiles.

One of the primary objects of the invention is the provision of a brake which is power applied.

Another object of the invention is the provision of a braking device which automatically operates to apply the brakes upon actuation of a control device of the vehicle.

Still another object is the provision of a braking device of the character described which is simple, effective and not subject to undue stresses.

How the foregoing together with such other objects and advantages as may hereinafter appear or are incident to our invention, are realized, is illustrated in preferred form in the accompanying drawings, wherein:

Fig. 2 is a partial side view and a partial section taken on the line 2—2 of Fig. 3 of a transmission box with the pump of our device applied thereto;

Fig. 3 is an end view of Fig. 2 looking toward the right, the section of the pump being taken on the line 3—3 of Fig. 2;

Fig. 8 is a modified form of connection between the pump and transmission.

Figure 1:
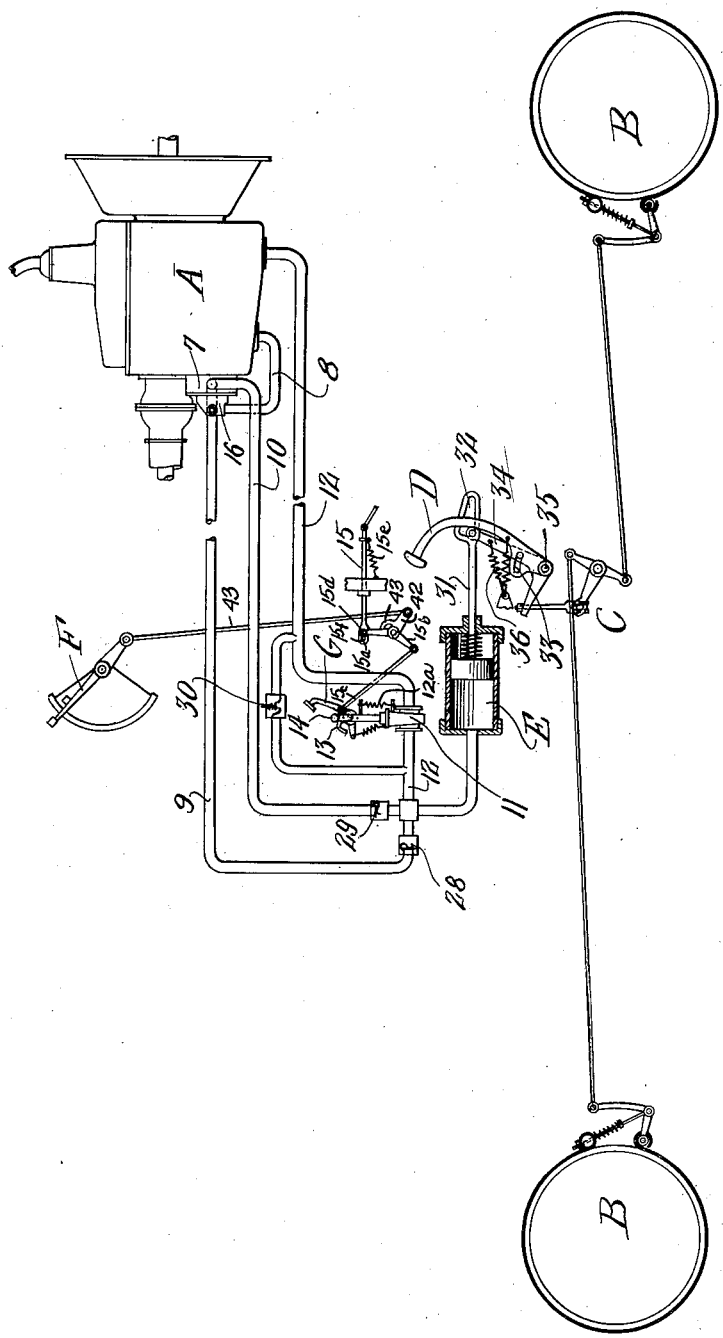
Fig. 1 is a diagrammatic illustration of the mechanism.

In Fig. 1 we have shown a transmission box A, brake drums B, brake rigging C, brake pedal D, brake operating cylinder E, gas control lever F, and a foot accelerator G.

An oil pump is shown at 7 the operation of which will be presently described, which pump receives oil from the transmission case thru the connection 8 and delivers oil thru either of the connections 9 or 10, as the case may be, to the brake operating cylinder E in the event that the valve 11 is closed or back into the transmission case thru the by-pass pipe 12 in the event that the valve 11 is open.

The valve 11 is controlled by the actuation of the foot accelerator G as will now appear. A cam 13 is provided on the accelerator G which cam raises or lowers the valve stem 14 of the gate valve 11 to open and close the valve. The cam is of such configuration that when the accelerator is in its normal position the valve stem is in engagement with the low point of the cam thus closing the valve. The spring 12ª operates to keep the valve stem in engagement with the cam. As the accelerator is depressed the valve is raised to open position by virtue of the rise of the cam. It is to be noted that the cam 13 is concentric from the high point on, so that the load of the valve need only be overcome during a small portion of the movement of the accelerator.

It will be seen that a slot 15ª is provided in the carbureter valve operating rod 15 so that the accelerator does not operate the carburetor valve until the valve 11 has been opened, thus insuring the release of the brakes before acceleration of the engine. The accelerator G is connected to the lever 15ᵇ by means of a link 15ᶜ and the lever 15ᵇ is provided with a pin 15ᵈ having lost motion connection with operating rod 15 by virtue of the slot 15ª. The rod 15 is normally kept in engagement with the pin 15ᵈ by means of the sping 15ᵉ and thus maintains the lost motion at 15ᵇ, making it possible to depress the accelerator somewhat before acceleraton of the engine.

From the foregoing it will be apparent that as pressure builds up in the brake operating cylinder E the brakes will be applied thru the medium of the brake rigging C and upon by-passing the fluid to the transmission case the brakes will be released.

Referring now to the pump and the manner in which it is operated we have shown in this instance a gear pump 7 a portion of the casing of which is formed as part of the transmission case or housing and on the outside thereof, although it may be desirable in some cases to locate the pump within the housing and submerged in the transmission oil. The balance of the pump casing is in the form of a detachable cover 16, to be hereinafter more fully described. The pump comprises a pair of meshing spur gears 17, 17, one of which is mounted on a stub shaft 18 and the other is mounted on a shaft 19 extending into the transmission case. Secured to the shaft 19, as by means of a key, is a spur gear 20 which meshes with the sliding gear 21 of the transmission gear set. The gear 20 is of sufficient length to be in mesh with the sliding gear 21 in all of its positions, namely, reverse, neutral, and low speed positions. By means of this connection between the pump and the transmission it will be seen that the pump gears will rotate whenever the automobile is in motion. In this connection it is pointed out that when the transmission device is driving at other speeds than those provided by the gear 21, the gear 21 is in the neutral position shown in Fig. 2 and drives the gear 20, because the shaft on which the gear 21 is splined rotates in all speeds of the transmission, as is well understood in this art. If the usual clutch is released to disconnect the gear set from the engine, then the shaft carrying the gear 21 is rotated from the rear wheels because of the connection of said shaft to the propeller shaft.

The cover 16 is provided with a valve chest for a pair of oppositely acting valves 22 and 23 operating as follows:

Assuming that the automobile is in movement in a forward direction with the transmission gears in position for direct drive, in which position the gear 21 will be in its neutral or intermediate position as shown in Fig. 2, then the gear 20 will be rotating in a counterclockwise direction as viewed from the front of the automobile, as will the upper pump gear of the pair of gears 17, 17.

Figure 4:
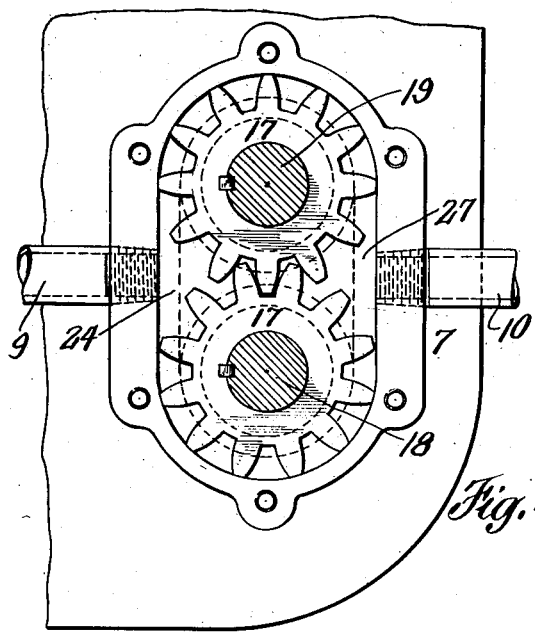
Fig. 4 is a sectional view of the pump taken on the line 4—4 of Fig. 2.
Figure 5:
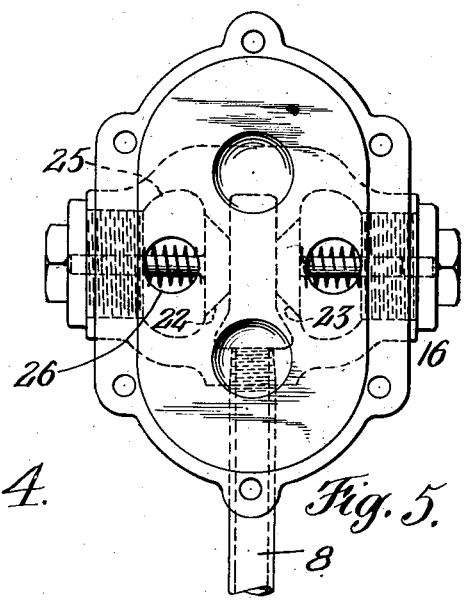
Fig. 5 is a view taken on the line 5—5 of Fig. 2.
Figure 6:
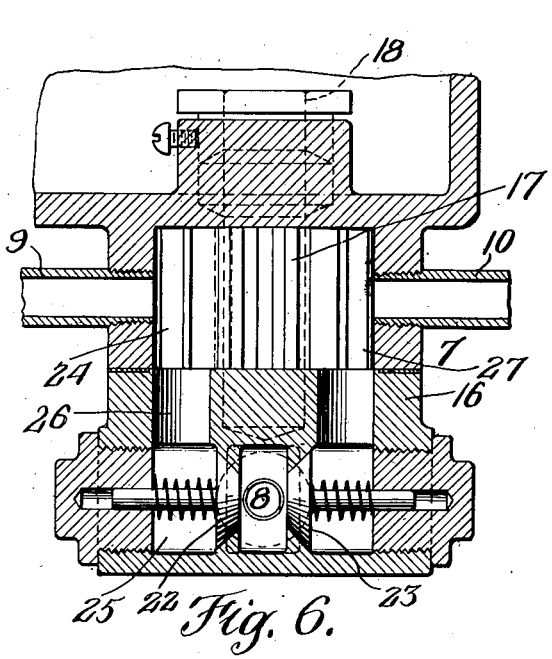
Fig. 6 is a section taken on the line 6—6 of Fig. 3.

Referring now more particularly to Figs. 4, 5 and 6 it will be seen that by virtue of the rotation above referred to a suction will be created in the space or chamber 24 and the valve chamber 25 thru the medium of the communicating port 26, which suction causes the valve 22 to open whereupon oil from the transmission case thru the connection 8 is drawn into the pump. The oil is passed from the space or chamber 24 to the opposite space or chamber 27 by the gears 17, 17. Assuming now that the accelerator G is in its normal position and the valve 11 closed then the oil from the chamber 27 will be delivered to the brake operating cylinder E thru the pipe connection 10. It is obvious that the valve 23 will be held to its seat.

Now assuming that the automobile is in movement in a rearward direction as for example when it is in reverse gear or rolling backwards in neutral then the direction of rotation of the pump gears will be in the opposite direction and oil will be drawn past the valve 23 into the chamber 27, passed to chamber 24 by the pump gears 17, 17 and delivered to the brake operating cylinder E thru the medium of pipe connection 9 which is connected into the pipe 10 in advance of the cylinder E. Check valves 28 and 29 are provided in the pipes 9 and 10 in advance of the point of connection of said pipes whereby local circulation of the pump is prevented.

In order to prevent excessive pressure building up we have provided a by-pass from one side of the valve 11 to the other and have located a relief valve 30 in said by-pass which may be set to relieve the pressure when it reaches a predetermined value.

Reverting now to the connections from the brake operating cylinder E to the brake rigging C it will be seen that the piston rod 31 is provided with a slotted portion 32, and that the brake pedal D is provided with a slot 33 which slots cooperate with pins in the brake actuating lever 34 to prevent interference when operating the brake either by foot or by power.

In the position of the parts as shown in Fig. 1 the brake is being power applied and it will be seen that the lever 34 in its movement does not carry the brake pedal D with it by virtue of the pin and slot 33. It is pointed out that the pedal D and lever 34 are independent of one another in their movement within the limits of the pin and slot connection, both being idly pivoted on the shaft or rod 35. If, with the parts in the position shown, the brake pedal should be depressed the movement would be an idle one.

On the other hand should the pressure in the cylinder E be released, the lever 34 would return to its normal position under the influence of the spring 36 and release the brakes. If it is then desired to apply the brakes by foot, pressure on the pedal will carry the lever 34 with it applying the brakes. The free end of the lever obviously, then travels in the slot 32 without moving the power piston.

From the foregoing it will become apparent that the device has many advantages especially when driving in the city traffic by virtue of the fact that by merely releasing the foot from the accelerator the brakes are power applied, which step is a preliminary to stopping in automobiles as at present equipped.

At times as for example when driving in open country it may be found desirable to operate entirely by foot brake and to have the power device ineffective to permit coasting. This may be accomplished by setting the gas lever on the steering wheel quadrant in a slightly advanced position which will prevent the foot accelerator from returning all the way to its normal position, thus holding the valve 11 in open position and bypassing the oil to the transmission case. With the gas lever in this position the engine will immediately begin to accelerate as soon as the accelerator is depressed. This operation will be clear from the following: The gas lever F is connected to a lever 42 by means of a link 43, so that movement of the gas lever F is transmitted to the lever 42. This lever 42 is pivoted on the same pin as is the lever 15$^b$. As the lever 42 moves, the member 43 thereof acts on the upper arm of the lever 15$^b$ to move it. Movement of the lever 15$^b$ causes movement of the foot accelerator by virtue of the link connection 15$^c$. It will be apparent, therefore, that if the gas lever is advanced sufficiently, the foot accelerator G will be depressed and the cam 13 will operate to lift the valve 11 from its seat, thus bypassing oil to the transmission case as above mentioned and enabling foot operation of the brakes.

While we have described our invention in connection with cable brakes it is to be understood that the device will function with other types of brake systems as for example hydraulic brakes.

Figure 7:
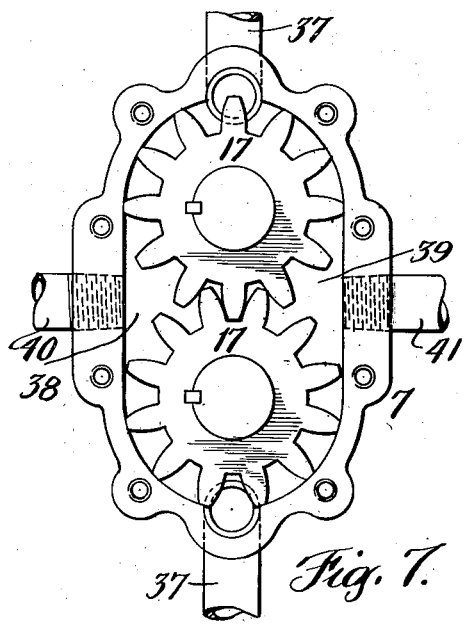
Fig. 7 is a face view of a modified form of pump.

In Fig. 7 we have shown a modified form of pump of simple construction adapted to operate in either direction. Fluid is introduced thru the pipes 37, 37 at either end of the pump casing, and is passed to either of the chambers 38 or 39 by the gears 17, 17 according to the direction of rotation and delivered thru either of the delivery pipes 40 or 41 as the case may be.

In Fig. 8 we have shown a modified form of connection between the transmission and the pump in which the sliding gear 21 of the transmission carries the gear 20$^a$ with it in its sliding movement. The gear 20$^a$ is splined to the pump shaft and is provided with flanges 20$^b$ for engaging the gear 21.

We claim:—

1. In combination with an automotive vehicle and its usual controlling devices, of a brake therefor and means for actuating said brake automatically operated upon operation of one of said controlling devices, together with a connection between said controlling device and another controlling device whereby said automatic brake actuating means may be rendered ineffective.

2. In combination with an automobile and its gas control means including the usual hand throttle and foot accelerator, of a brake therefor and means for actuating said brake automatically operated upon operation of the gas control means, together with means under control of the handthrottle whereby the automatic brake actuating means may be rendered ineffective.

In testimony whereof, we have hereunto signed our names.

WILLIAM H. FURNESS.
STANDISH F. HANSELL.